(12) United States Patent
Yang (10) Patent No.: US 10,047,513 B2
(45) Date of Patent: Aug. 14, 2018

(54) BEAM FRAME ASSEMBLY HAVING JOINT DEVICE

(71) Applicant: JING-XIN SOLAR LTD., Tainan (TW)

(72) Inventor: Ching-Lung Yang, Tainan (TW)

(73) Assignee: Jing-Xin Solar Ltd., Tainan (TW)

( * ) Notice: Subject to any disclaimer, the term of this patent is extended or adjusted under 35 U.S.C. 154(b) by 0 days.

(21) Appl. No.: 15/661,352

(22) Filed: Jul. 27, 2017

(65) Prior Publication Data

US 2018/0030717 A1 Feb. 1, 2018

(30) Foreign Application Priority Data

Jul. 28, 2016 (TW) .............................. 105211397 U (51) Int. Cl.
*E04B 1/24* (2006.01)
*E04C 3/07* (2006.01)
*E04C 3/04* (2006.01)

(52) U.S. Cl.
CPC .............. *E04B 1/2403* (2013.01); *E04C 3/07* (2013.01); *E04B 2001/2415* (2013.01); *E04B 2001/2418* (2013.01); *E04B 2001/2448* (2013.01); *E04B 2001/2457* (2013.01); *E04C 2003/0473* (2013.01)

(58) Field of Classification Search
CPC ..... E04C 3/07; E04C 3/11; E04C 3/09; E04C 2003/0491; E04C 2003/0473; E04B 7/045; E04B 2001/2457; E04B 2001/2415; E04B 2001/2448; E04B 1/2403; E04B 2001/2418
See application file for complete search history.

(56) References Cited

U.S. PATENT DOCUMENTS

| 2,231,880 | A | * | 2/1941 | Buelow | ................. E04B 1/2403 52/280 |
| 2,943,716 | A | * | 7/1960 | Babcock | ................... E04B 1/24 52/126.1 |
| 3,309,120 | A | * | 3/1967 | Wada | ........................ E04C 3/40 403/231 |

(Continued)

FOREIGN PATENT DOCUMENTS

WO    WO 2010124348 A1 * 11/2010 ............... E04B 1/24

*Primary Examiner* — Adriana Figueroa
*Assistant Examiner* — Jessie T Fonseca
(74) *Attorney, Agent, or Firm* — Muncy, Geissler, Olds & Lowe, P.C.

(57) ABSTRACT

A joint device includes a main fixing plate, an auxiliary fixing plate, and a fastener. The main fixing plate has a vertical wall disposed between a longitudinal beam and a transverse beam, a first extending wall extending towards a side of the longitudinal beam from the vertical wall and crossing over and abutting against an upper portion of the longitudinal beam, and a second extending wall extending towards a side of the transverse beam from the vertical wall and crossing over and abutting against a lower portion of the transverse beam. The auxiliary fixing plate is disposed in an open groove of the transverse beam in a way that the transverse beam is clamped between the auxiliary fixing plate and the vertical wall of the main fixing plate. The fastener secures the longitudinal beam, the transverse beam, the main fixing plate and the auxiliary fixing plate together.

10 Claims, 7 Drawing Sheets

(56) References Cited

U.S. PATENT DOCUMENTS

| | | | | |
|---|---|---|---|---|
| 4,069,638 A * | 1/1978 | Hasselqvist | ........... | B21C 37/104 403/231 |
| 4,464,074 A * | 8/1984 | Green | ................... | E04B 1/2403 211/182 |
| 5,832,683 A * | 11/1998 | Ito | ............................ | E04B 1/24 52/274 |
| 5,857,306 A * | 1/1999 | Pellock | ................. | E04B 1/5806 403/230 |
| 6,427,416 B1 * | 8/2002 | Rassel | ................... | E04B 1/2403 52/655.1 |
| 7,856,763 B2 * | 12/2010 | Keys | ...................... | E04B 7/045 403/232.1 |
| 9,376,797 B2 * | 6/2016 | Yang | ........................ | E04B 1/24 |
| 2002/0170260 A1 * | 11/2002 | Wheeler | ............... | E04B 2/7457 52/656.1 |
| 2004/0049993 A1 * | 3/2004 | Saldana | ................ | E04B 1/2403 52/90.2 |
| 2006/0096230 A1 * | 5/2006 | Liescheidt | ................ | E04C 3/09 52/633 |
| 2007/0209311 A1 * | 9/2007 | Keys | ....................... | E04B 7/045 52/696 |
| 2008/0053034 A1 * | 3/2008 | Matechuk | ................ | E04B 1/24 52/702 |
| 2008/0283702 A1 * | 11/2008 | Ikerd | ..................... | E04B 1/2604 248/228.1 |
| 2012/0047836 A1 * | 3/2012 | Sareyka | .................. | E04B 9/068 52/506.06 |
| 2014/0083046 A1 * | 3/2014 | Yang | ........................ | E04B 1/24 52/704 |
| 2015/0275501 A1 * | 10/2015 | Houghton | ............ | E04B 1/2403 52/854 |
| 2016/0356033 A1 * | 12/2016 | Houghton | ............ | E04B 1/2403 |

* cited by examiner

BEAM FRAME ASSEMBLY HAVING JOINT DEVICE

BACKGROUND OF THE DISCLOSURE

1. Field of the Disclosure

The present disclosure relates generally to a joint device for fastening longitudinal and transverse beams together, and more particularly, to a beam frame assembly using the joint device.

2. Description of the Related Art

Figure 1:
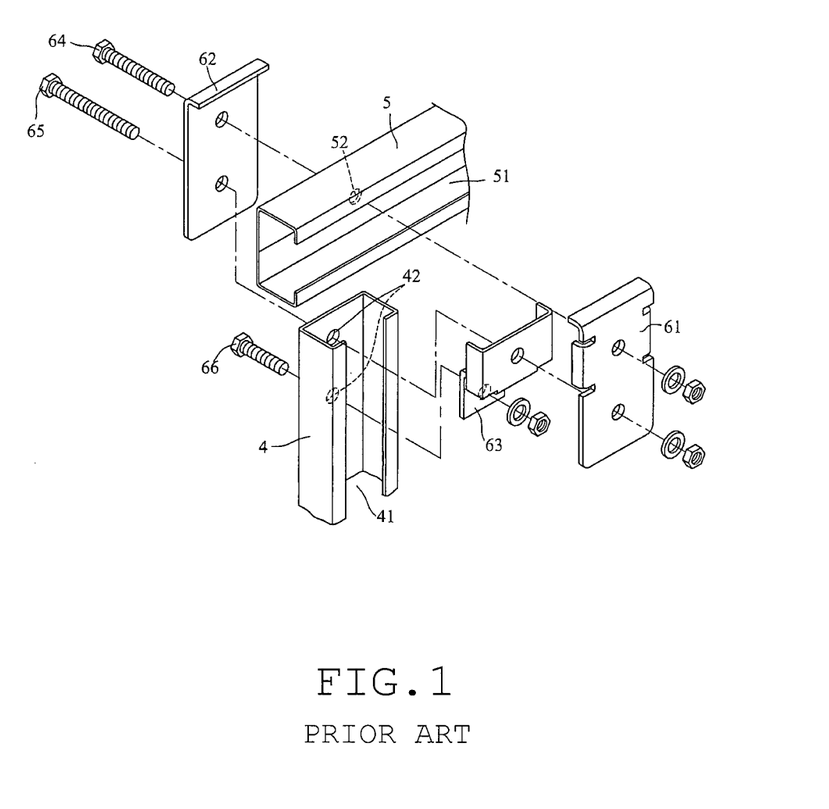
FIG. 1 is a three-dimensional exploded view showing a conventional joint device of a beam frame assembly disposed between a longitudinal beam and a transverse beam.
Figure 2:
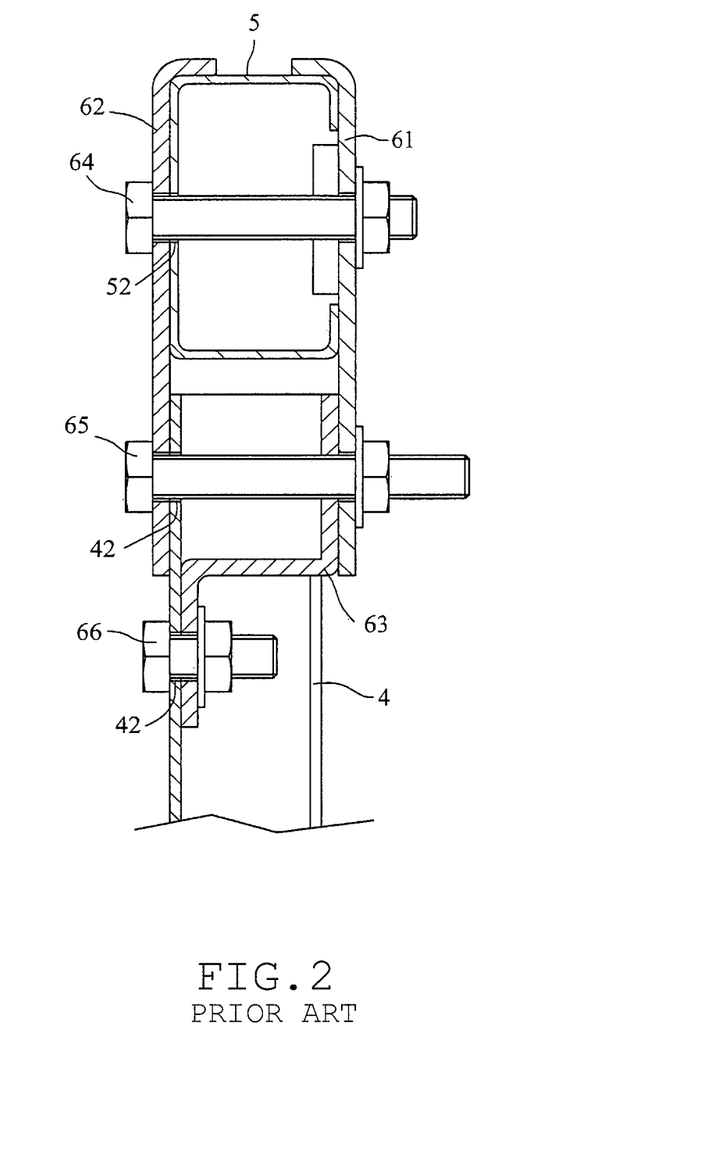
FIG. 2 is a cross-sectional view showing the assembled structure of the conventional beam frame assembly having the conventional joint device.

Referring to FIGS. 1 and 2, a conventional joint device for a beam frame assembly is adapted to be disposed between a longitudinal beam 4 and a transverse beam 5 of the beam frame assembly. The longitudinal beam 4 is abutted below the transverse beam 5 and has an open groove 41 extending vertically, and the transverse beam 5 has an open groove 51 extending horizontally. The joint device for the beam frame assembly comprises a front fixing plate 61, a rear fixing plate 62, an auxiliary fixing plate 63, a first fastener 64, a second fastener 65 and a third fastener 66. The longitudinal beam 4 and the transverse beam 5 are clamped between the front fixing plate 61 and the rear fixing plate 62. The auxiliary fixing plate 63 is disposed in the open groove 41 of the longitudinal beam 4. The first fastener 64 is used to fasten the front fixing plate 61, the rear fixing plate 62 and the transverse beam 5 together. The second fastener 65 is used to fasten the front fixing plate 61, the rear fixing plate 62, the auxiliary fixing plate 63 and the longitudinal beam 4 together. The third fastener 66 is used to fasten the auxiliary fixing plate 63 and the longitudinal beam 4 together. With the connection of the front fixing plate 61, the rear fixing plate 62, the auxiliary fixing plate 63, the first fastener 64, the second fastener 65 and the third fastener 66, the longitudinal beam 4 and the transverse beam 5 can be stably connected to each other.

During the process of assembling the beam frame assembly, an assembler must separately assemble the front fixing plate 61, the rear fixing plate 62, the auxiliary fixing plate 63, the first fastener 64, the second fastener 65, and the third fastener 66 between the longitudinal beam 4 and the transverse beam 5. Because numerous components are required to assemble the beam frame assembly, and the longitudinal beam 4 and the transverse beam 5 have to be provided with two through holes 42 and one through hole 52 respectively for the passing of the first fastener 64, the second fastener 65 and the third fastener 66, the assembling time is increased and the assembling process is complicated, such that the construction efficiency of the beam frame assembly is extremely low. Therefore, the conventional joint device for connecting the longitudinal and transverse beams of a beam frame assembly needs to be improved.

SUMMARY OF THE DISCLOSURE

The present disclosure is accomplished in view of the above-noted circumstances. An objective of the present disclosure is to provide a beam frame assembly using an improved joint device, which is capable of enhancing the construction efficiency of the beam frame assembly.

To attain the above objective, the present disclosure provides a beam frame assembly comprising a joint device for connecting longitudinal and transverse beams extending in vertical and horizontal directions, respectively. The longitudinal beam and the transverse beam are spacedly overlapped with each other and the transverse beam has an open groove. The joint device comprises a main fixing plate, an auxiliary plate and a fastener. The main fixing plate includes a vertical wall disposed between the longitudinal beam and the transverse beam, a first extending wall extending towards a side of the longitudinal beam from the vertical wall and crossing over and abutting against an upper portion of the longitudinal beam, and a second extending wall for extending towards a side of the transverse beam from the vertical wall and crossing over and abutting against a lower portion of the transverse beam. The auxiliary fixing plate is disposed in the open groove of the transverse beam in a way that the transverse beam is clamped between the auxiliary fixing plate and the vertical wall of the main fixing plate. The fastener is inserted through the longitudinal beam, the transverse beam, the main fixing plate and the auxiliary fixing plate to fasten the longitudinal beam, the transverse beam, the main fixing plate and the auxiliary fixing plate together.

The effect of the present disclosure lies in that with the structural design of the main fixing plate, the auxiliary fixing plate and the fastener, the longitudinal beam and the transverse beam can be securely assembled with each other through fewer components.

DETAILED DESCRIPTION OF THE DISCLOSURE

In the following description, it is noted that the same reference numeral is denoted to the same or similar element.

Figure 3:
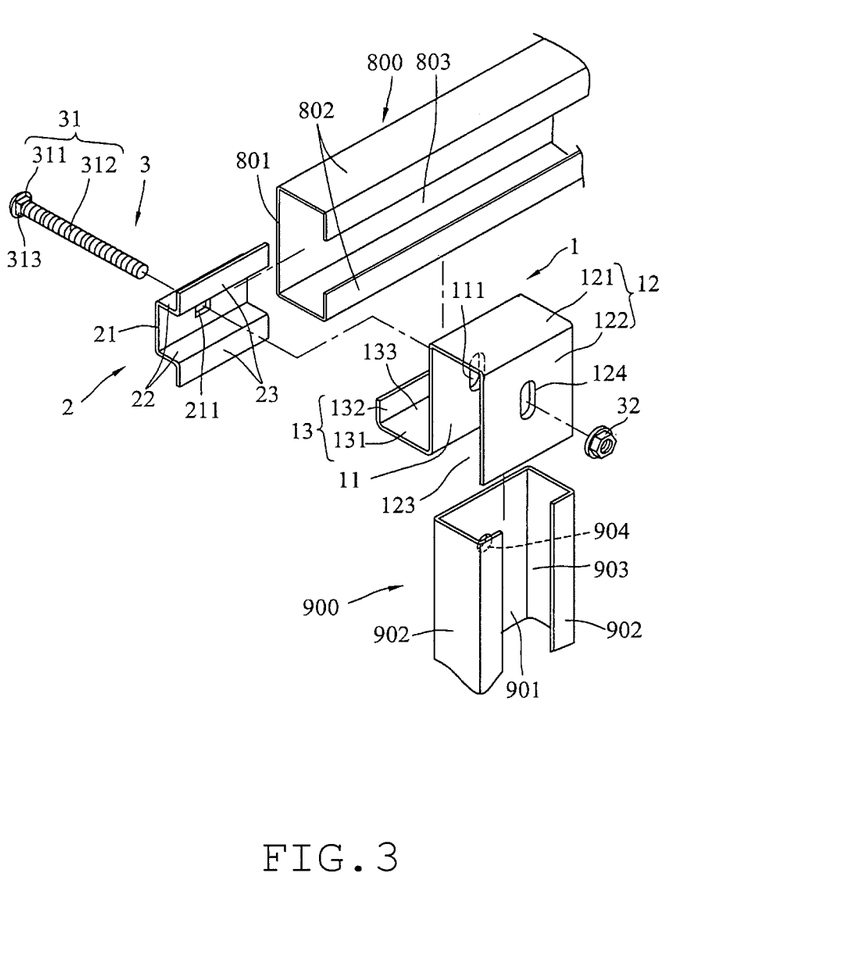
FIG. 3 is a three-dimensional exploded view of a beam frame assembly according to a first embodiment of the present disclosure, in which a joint device is disposed between a longitudinal beam and a transverse beam.
Figure 4:
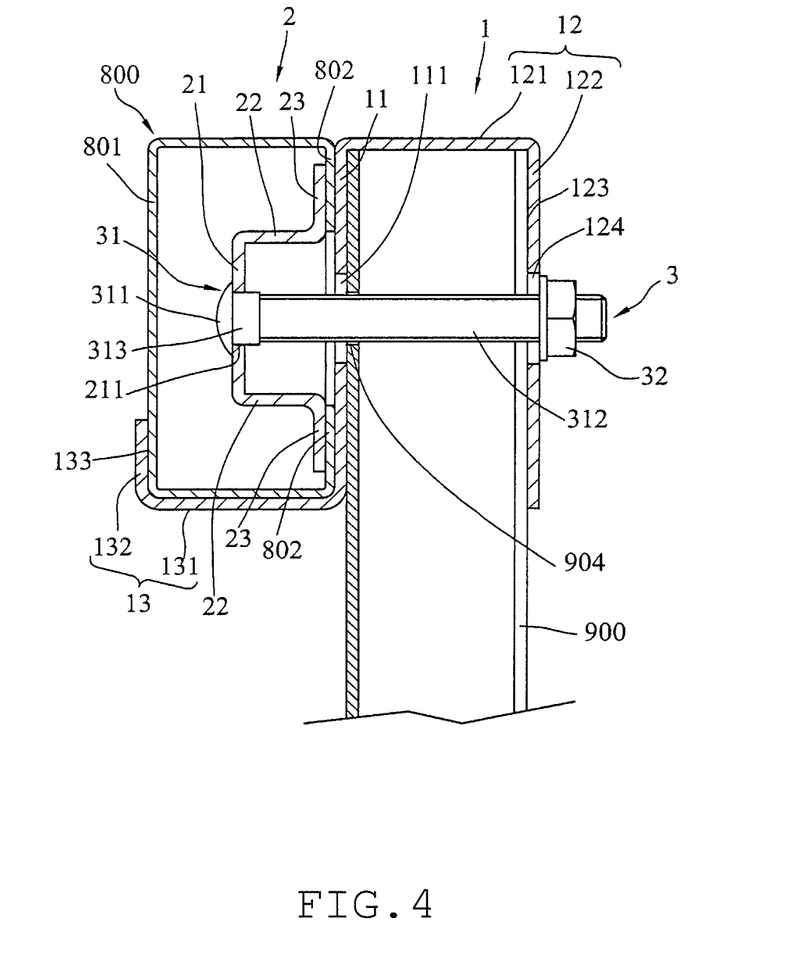
FIG. 4 is a cross-sectional view showing the assembled structure of the beam frame assembly of the first embodiment of the present disclosure.

Referring to FIGS. 3 and 4, a joint device of a beam frame assembly according to a first embodiment of the present disclosure is adapted to be disposed between a longitudinal beam 900 and a transverse beam 800 of the beam frame assembly. The longitudinal beam 900 is located in front of the transverse beam 800 and is a C-shaped steel beam extending upward and downward, i.e. extending in a vertical direction. The longitudinal beam 900 includes a base plate 901, two lateral plates 902 and an open groove 903 extending vertically. The lateral plates 902 respectively extend forward from the left and right sides of the base plate 901 and extend towards each other. The open groove 903 extending upward and downward is defined by the base plate 901 and the lateral plates 902, and has an opening facing forward. The base plate 901 has a through hole 904 penetrating through the front and rear surfaces of the base plate 901. The transverse beam 800 is a C-shaped steel beam extending leftward and rightward, i.e. extending in a horizontal direction, and includes a base plate 801, two lateral plates 802 and an open groove 803. The lateral plates 802 respectively extend forward from the upper and lower sides of the base plate 801 and extend towards each other. The open groove 803 extending leftward and rightward is defined by the base plate 801 and the lateral plates 802, and has an opening 803 facing forward.

In this embodiment, in order to conveniently describe the relationships of the positions or orientations between the components of the joint device of the beam frame assembly of the present disclosure, the longitudinal beam 900 is designed to extend upward and downward, the transverse beam 800 is designed to extend leftward and rightward, the longitudinal beam 900 is designed to be spacedly located in front of the transverse beam 800, and the openings 903, 803 of the longitudinal beam 900 and the transverse beam 800 are designed to face forward. In actual practice, the relationship of the position or orientation of the longitudinal beam 900 and the transverse beam 800 is not limited to the foregoing description, and is applicable as long as the relative positions between the longitudinal beam 900, the transverse beam 800 and the components of the joint device of the beam frame assembly are identical to those of the present disclosure.

The joint device of the beam frame assembly in accordance with the present disclosure comprises a main fixing plate 1, an auxiliary fixing plate 2 and a fastener 3.

The main fixing plate 1 includes a vertical wall 11, a first extending wall 12 and a second extending wall 13. The vertical wall 11 is configured to be situated between the longitudinal beam 900 and the transverse beam 800. The first extending wall 12 extends forward and downward from a front side of the vertical wall 11 in a way that the first extending wall 12 crosses over and abuts against an upper portion of the longitudinal beam 900. The second extending wall 13 extends backward and upward from a rear side of the vertical wall 11 in a way that the second extending wall 13 crosses over and abuts against a lower portion of the transverse beam 800. The vertical wall 11 is upright plate having a height substantially equal to a width of the transverse beam 800. The vertical wall 11, the first extending wall 12 and the second extending wall 13 of the main fixing plate 1 are monolithically formed by bending a plate material.

The vertical wall 11 has a longitudinal elongated through hole 111. The first extending wall 12 has an upper abutment portion 121 and an upper clamp portion 122. The upper abutment portion 121 extends forward from the vertical wall 11 and is configured to abut against an upper portion of the longitudinal beam 900. The upper clamp portion 122 extends downward from the upper abutment portion 121 and is configured to be disposed in front of the longitudinal beam 900. The upper abutment portion 121, the upper clamp portion 122 and the vertical wall 11 combinedly define a first space 123 for accommodating the upper portion of the longitudinal beam 900. The upper clamp portion 122 has a longitudinal elongated through hole 124. The second extending wall 13 has a lower abutment portion 131 and a lower clamp portion 132. The lower abutment portion 131 extends backward from the vertical wall 11 and is configured to abut against a lower portion of the transverse beam 800. The lower clamp portion 132 extends upward from the lower abutment portion 131 and is configured to be disposed behind the transverse beam 800. The lower abutment portion 131, the lower clamp portion 132 and the vertical wall 1 combinedly define a second space 133 for accommodating the lower portion of the transverse beam 800.

The auxiliary fixing plate 2 is configured to be disposed in the open groove 803 of the transverse beam 800 and includes a vertical base wall 21, two connecting walls 22 and two abutment walls 23. The base wall 21 has a square-shaped through hole 211. The two connecting walls 22 respectively extend towards the vertical wall 11 from the upper and lower sides of the base wall 21. The two abutment walls 23 respectively extend from the connecting walls 22 in two adverse directions and are configured to respectively abut against the inner surfaces of the lateral plates 802 of the transverse beam 800. The base wall 21, the connecting walls 22 and the abutment walls 23 of the auxiliary fixing plate 2 are monolithically formed by bending a plate material.

The fastener 3 includes a screw 31 and a nut 32. The screw 31 has a head 311, a threaded body 312 and a positioning portion 313. The positioning portion 313 extends forward from the head 311 and is configured to be secured in the through hole 211 of the base wall 21. The threaded body 312 extends forward from the positioning portion 313 and is configured to be sequentially inserted through the elongated through hole 111 of the vertical wall 11, the through hole 904 of the longitudinal beam 900, and the elongated through hole 124 of the upper clamp portion 122. The positioning portion 313 has a square cross-section to allow itself to be non-rotatably secured in the through hole 211. In practice, the cross-sections of the positioning portion 313 and the through hole 211 are not limited thereto and may be hexagonal, pentagonal, etc. as long as the positioning portion 313 cannot rotate relative to the through hole 211. The nut 32 is screwed onto the threaded body 312 and abuts against a front side of the upper clamp portion 122. The longitudinal beam 900, the transverse beam 800, the main fixing plate 1, and the auxiliary fixing plate 2 are fastened together by the screw 31 and the nut 32.

In assembly of the beam frame assembly of the present disclosure, the through hole 904 is first formed on the longitudinal beam 900. The upper portion of the longitudinal beam 900 is then received in the first space 123, and the through hole 904 of the longitudinal beam 900 is in alignment with the elongated through hole 111 of the vertical wall 11 and the elongated hole 124 of the upper clamp portion 122. The auxiliary fixing plate 2 is placed behind the vertical wall 11 in a way that the abutment walls 23 are spaced apart from the vertical wall 11, then the screw 31 of the fastener is inserted through the auxiliary fixing plate 2, the vertical wall 11, the through hole 904 of the longitudinal beam 900 and the upper clamp portion 122 in a way that the positioning portion 313 is secured in the through hole 211. The head 311 of the screw 31 is welded to the base wall 21 and then the nut 32 is screwed onto the screw 31.

Subsequently, the joint device of the beam frame assembly of the present disclosure is coupled to the transverse beam 800 in a way that the auxiliary fixing plate 2 is accommodated in the open groove 803 of the transverse beam 800 and the transverse beam 800 is disposed in the second space 133, so that the lateral plates 802 of the transverse beam 800 are sandwiched between the auxiliary fixing plate 2 and the vertical wall 11. At this point, the joint device of the beam frame assembly is movable relative to the transverse beam 800. The nut 32 is then screwed up when the joint device of the beam frame assembly is located in a desired position. Because the cross-sections of the positioning portion 313 and the through hole 211 are configured to correspond to each other and the head 31 is welded to the base wall 21, the screw 31 is non-rotatable during tightening of the nut 32. After the fastener 3 is fastened, the lateral plates 802 of the transverse beam 800 are sandwiched tightly between the auxiliary fixing plate 2 and the vertical wall 11, and the longitudinal beam 900 is sandwiched tightly between the vertical wall 11 and the upper clamp portion 122.

The present disclosure is not limited to this embodiment, for example, during tightening of the fastener 3, a hand tool can be utilized to first fix the head 311 of the screw 31 so as to prevent the screw 31 from rotating when the nut 32 is screwed up.

In the condition that the joint device of the beam frame assembly of the present disclosure is completely assembled, the longitudinal beam 900 can be fastened to the main fixing plate 1 through the fastener 3 and the first extending wall 12, and the transverse beam 800 can be fastened to the main fixing plate 1 through the fastener 3, the second extending wall 13 and the auxiliary fixing plate 2. As a result, the longitudinal beam 900 and the transverse beam 800 can be firmly connected to each other by the present disclosure.

Figure 5:
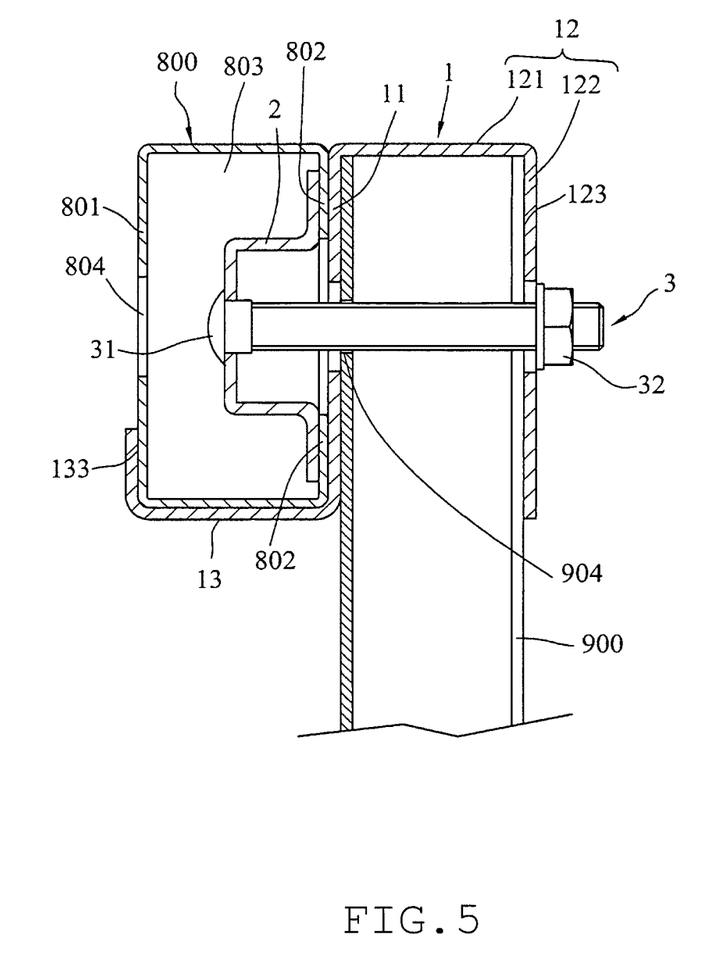
FIG. 5 is a cross-sectional view of a beam frame assembly of the first embodiment having an alternate transverse beam provided with an insertion hole.

Furthermore, referring to FIG. 5, in actual practice, an insertion hole 804 may be first formed on the base plate 801 of the transverse beam 800. As such, when assembling, the longitudinal beam 900 and the transverse beam 800 are respectively disposed in the first space 123 and the second space 133 of the main fixing plate 1, and the main fixing plate 1 is situated at a predetermined position of the transverse beam 800. Next, the auxiliary fixing plate 2 is accommodated in the open groove 803 of the transverse beam 800. The screw 31 can be finally inserted from the insertion hole 804 through the transverse beam 800, the auxiliary fixing plate 2, the vertical wall 11, the through hole 904 of the longitudinal beam 900, and the upper clamp portion 122. The nut 32 is then screwed onto the screw 31 so that the lateral plates 802 of the transverse beam 800 are sandwiched tightly between the auxiliary fixing plate 2 and the vertical wall 11, and the longitudinal beam 900 is sandwiched tightly between the vertical wall 11 and the upper clamp portion 122.

In conclusion, with the structural design of the main fixing plate 1, the auxiliary fixing plate 2, and the fastener 3 of the joint device of the beam frame assembly of the present disclosure, the longitudinal beam 900 and the transverse beam 800 of the beam frame assembly can be firmly connected to each other through fewer components. In addition, because only one through hole 904 has to be formed on the longitudinal beam 900, the drilling time is reduced, such that the assembling time can be effectively reduced. As a result, the construction efficiency of the beam frame assembly can be improved.

Figure 6:
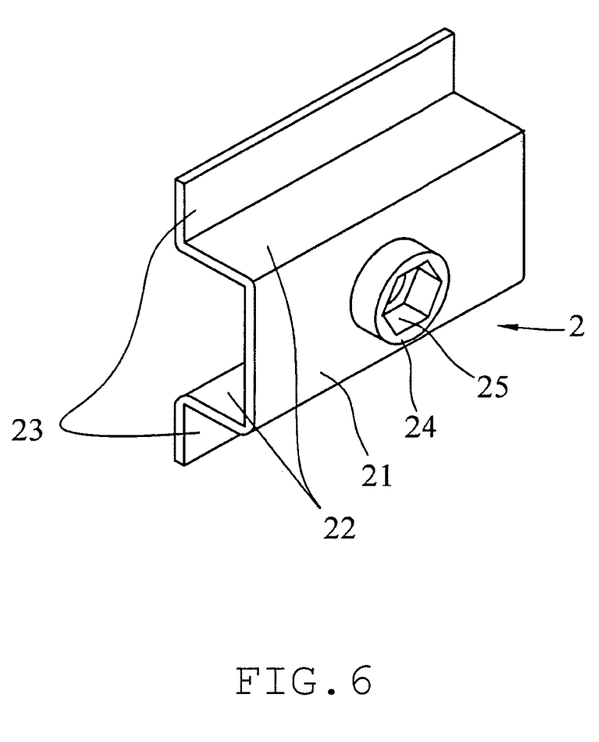
FIG. 6 is a three-dimensional view showing an auxiliary fixing plate of a joint device of a beam frame assembly according to a second embodiment of the present disclosure.
Figure 7:
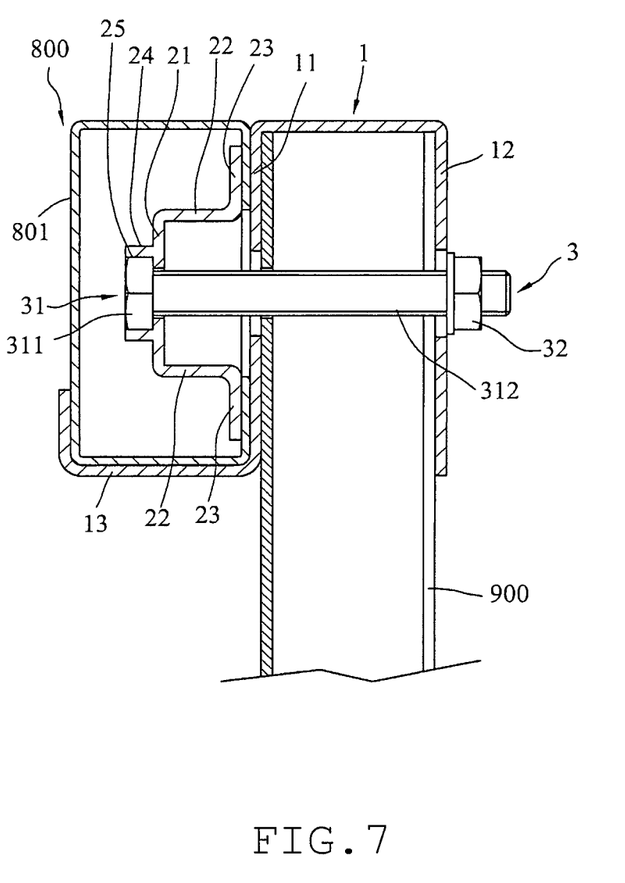
FIG. 7 is a cross-sectional view showing the assembled structure of the beam frame assembly of the second embodiment of the present disclosure.

Referring to FIGS. 6 and 7, a joint device of a beam frame assembly according to a second embodiment of the present disclosure has a structure substantially identical to that of the first embodiment. The difference of the second embodiment lies in that the auxiliary fixing plate 2 further includes a protrusion 24 protruding from the base wall 21 and having a cavity 25, the cross-section of the cavity 25 is hexagonal, the screw 31 is provided without the positioning portion 313, and the cross-section of the head 311 is hexagonal. Thus, the screw 31 can be non-rotatably secured in the cavity 25. In practice, the cross-sections of the head 311 and the cavity 25 are not limited thereto and may be square, pentagonal, etc. as long as the head 311 cannot rotate relative to the cavity 25.

What is claimed is:

1. A beam frame assembly, comprising:
a longitudinal beam extending in a vertical direction;
a transverse beam extending in a horizontal direction, the transverse beam being spacedly overlapped with the longitudinal beam and provided with an open groove extending in the horizontal direction; and
a joint device comprising:
a main fixing plate including a vertical wall disposed between the longitudinal beam and the transverse beam, a first extending wall extending towards a side of the longitudinal beam from the vertical wall and crossing over and abutting against an upper portion of the longitudinal beam, and a second extending wall extending towards a side of the transverse beam from the vertical wall and crossing over and abutting against a lower portion of the transverse beam;
an auxiliary fixing plate disposed in the open groove of the transverse beam in a way that the transverse beam is clamped between the auxiliary fixing plate and the vertical wall of the main fixing plate; and
a fastener inserted through the longitudinal beam, the transverse beam, the main fixing plate and the auxiliary fixing plate to fasten the longitudinal beam, the transverse beam, the main fixing plate and the auxiliary fixing plate together;
wherein said auxiliary fixing plate includes a vertical base wall, two connecting walls extending towards the vertical wall of said main fixing plate, and two abutment walls respectively and vertically extending from the connecting walls in two adverse directions and abutting against an inner surface of the transverse beam.

2. The beam frame assembly as claimed in claim 1, wherein said fastener includes a screw and a nut; the screw has a head abutted against a side portion of the auxiliary fixing plate remote from the vertical wall, and a threaded body passing through the auxiliary fixing plate, the vertical wall, the longitudinal beam and the first extending wall; the nut is screwed onto the threaded body in a way that the auxiliary fixing plate, the longitudinal beam, the transverse beam, and the main fixing plate are clamped between the head of the screw and the nut.

3. The beam frame assembly as claimed in claim 2, wherein said auxiliary fixing plate includes a through hole; the screw has a positioning portion between the head and the threaded body; the positioning portion is non-rotatably secured in the through hole of said auxiliary fixing plate.

4. The beam frame assembly as claimed in claim 3, wherein the through hole of said auxiliary fixing plate is a square-shaped hole and the positioning portion of the screw has a square cross-section corresponding to the through hole of said auxiliary fixing plate.

5. The beam frame assembly as claimed in claim 2, wherein said auxiliary fixing plate has a cavity formed in the side portion of the auxiliary fixing plate, and the head of the screw is non-rotatably secured in the cavity.

6. The beam frame assembly as claimed in claim 3, wherein the head of the screw is welded to said auxiliary fixing plate.

7. The beam frame assembly as claimed in claim 1, wherein the transverse beam is provided with a base plate and two lateral plates respectively extending outwardly from an upper side and a lower side of the base plate and extending toward each other; the two abutment walls of said auxiliary fixing plate respectively abut against the inner surfaces of the two lateral plates of the transverse beam.

8. The beam frame assembly as claimed in claim 1, wherein the base wall, the two connecting walls and the two abutment walls of said auxiliary fixing plate are monolithically formed by bending a plate material, and the vertical wall, the first extending wall and the second extending wall of said main fixing plate are monolithically formed by bending a plate material.

9. The beam frame assembly as claimed in claim 1, wherein the first extending wall of said main fixing plate has an upper clamp portion and an upper abutment portion connecting the vertical wall and the upper clamp portion; the longitudinal beam is clamped between the vertical wall and the upper clamp portion of said main fixing plate, and the upper abutment portion abuts against the upper portion of the longitudinal beam.

10. The beam frame assembly as claimed in claim 1, wherein the second extending wall of said main fixing plate has a lower clamp portion and a lower abutment portion connecting the vertical wall and the lower clamp portion; the transverse beam is clamped between the vertical wall and the lower clamp portion of said main fixing plate, and the lower abutment portion abuts against the lower portion of the transverse beam.

* * * * *